Jan. 29, 1946.   R. STEVENSON   2,393,835
CONTROL FOR FRICTION CLUTCHES
Filed March 30, 1942   3 Sheets-Sheet 1

INVENTOR.
Robert Stevenson
BY Barlow & Barlow
ATTORNEYS.

Jan. 29, 1946.   R. STEVENSON   2,393,835
CONTROL FOR FRICTION CLUTCHES
Filed March 30, 1942   3 Sheets-Sheet 2
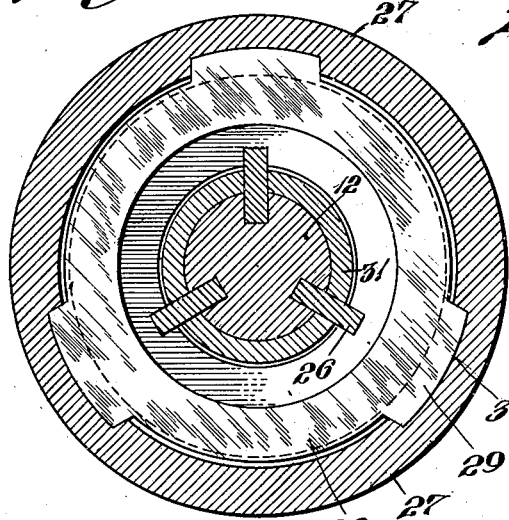
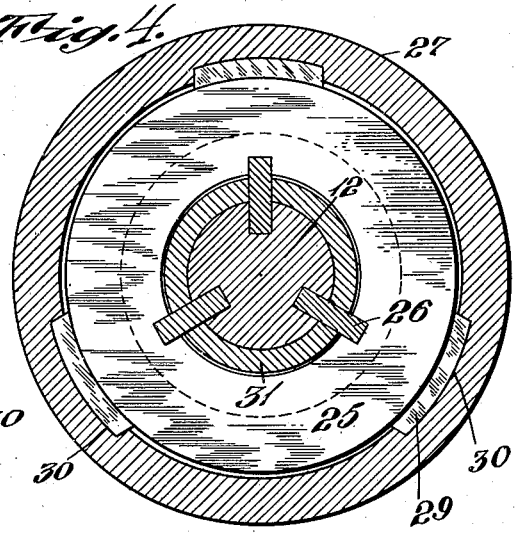
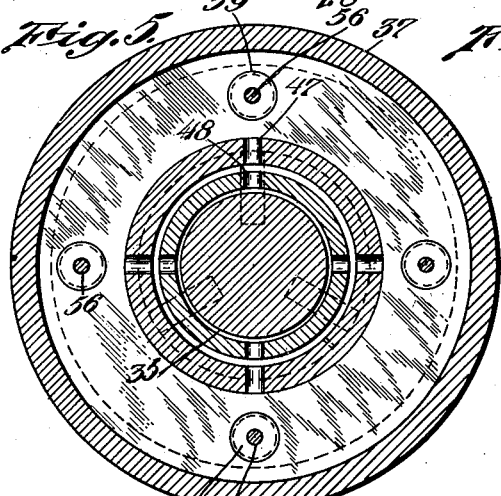
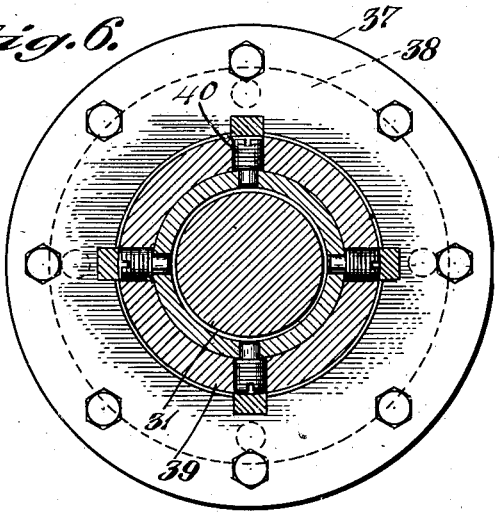
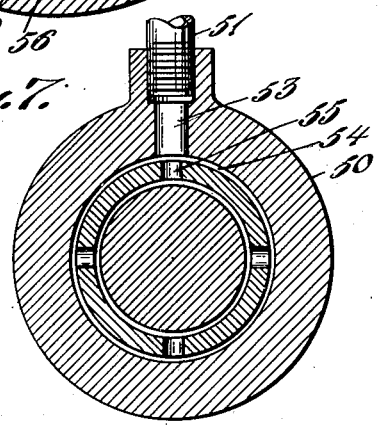
INVENTOR.
Robert Stevenson
BY Barlow & Barlow
ATTORNEYS.

Jan. 29, 1946.  R. STEVENSON  2,393,835
CONTROL FOR FRICTION CLUTCHES
Filed March 30, 1942   3 Sheets-Sheet 3

INVENTOR.
Robert Stevenson
BY
Barlow & Barlow
ATTORNEYS.

Patented Jan. 29, 1946

2,393,835

UNITED STATES PATENT OFFICE 2,393,835

CONTROL FOR FRICTION CLUTCHES

Robert Stevenson, Providence, R. I., assignor to Stevenson Engineering Corporation, a corporation of Rhode Island Application March 30, 1942, Serial No. 436,781

1 Claim. (Cl. 285—96.3)

This invention relates to a friction clutch and more particularly to a hydraulic control for the clutch.

Heretofore in the use of friction clutches some difficulty has been experienced in the control of the clutch in that the take-up for applying pressure on the friction surfaces has been too rapid, which has been the experience of lever controls for such friction clutches.

One of the objects of this invention is to provide a hydraulic control for the friction clutch whereby the pressure may be more accurately controlled, such as through a needle valve or the like, that a very slow take-up may occur.

Another object of the invention is to provide an arrangement of hydraulic take-up for the clutch by which a large amount of pressure may be applied to the friction surfaces.

A further object of the invention is to provide a seal for the hydraulically applied pressure whereby the pressure of the liquid itself will act upon the seal to control the pressure applied to the seal.

With these and other objects in view, the invention consists of certain novel features of construction, as will be more fully described and particularly pointed out in the appended claim.

In the accompanying drawings:

Figs. 3, 4, 5, 6 and 7 are sections respectively on correspondingly marked lines of Fig. 2.

Figure 1:
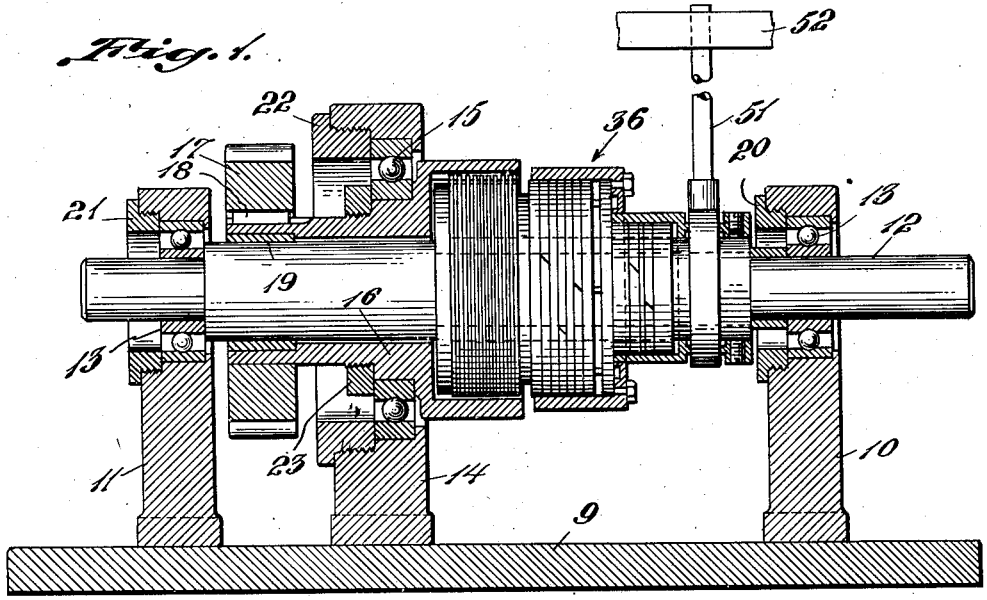
Fig. 1 is a sectional view of the operating parts of my clutch showing the conventional mounting for the shaft to which power is applied.

This invention consists generally in the use of a fixed ringlike member which presents sealing surfaces on its opposite sides to be engaged by a rotary part of the clutch and the provision of a shaft within this rotary part which will be coupled or uncoupled to the rotary part through friction surfaces, fluid being caused to enter through the fixed part and being transmitted through one or both, or between the rotary parts to apply pressure on the friction surfaces with a sleeve being utilized for the sealing of the entrance of this liquid which will be carried by the outer rotary part, and the following is a more detailed description.

With reference to the drawings, 9 designates some suitable supporting base with mounting standards 10 and 11 for rotatably supporting a shaft 12 by ball bearings 13 which shaft is suitably driven in any desired manner not here illustrated, it being understood that this shaft will be continuously rotated and from this rotation there will be taken off intermittently driving power as desired. A support 14 is provided with a ball bearing 15 for suitably rotatably mounting the member 16 which carries a gear 17 from which the power to be derived intermittently is taken, said gear being keyed as at 18 to this member 16. A bushing 19 is provided at one end of this member 16 which engages the shaft 12. Collars 20, 21 and 22 are utilized for engagement with the supports 10, 11 and 14 to suitably hold the ball bearings in place while another collar 23 is provided for the inner race of ball bearing 15.

Figure 2:
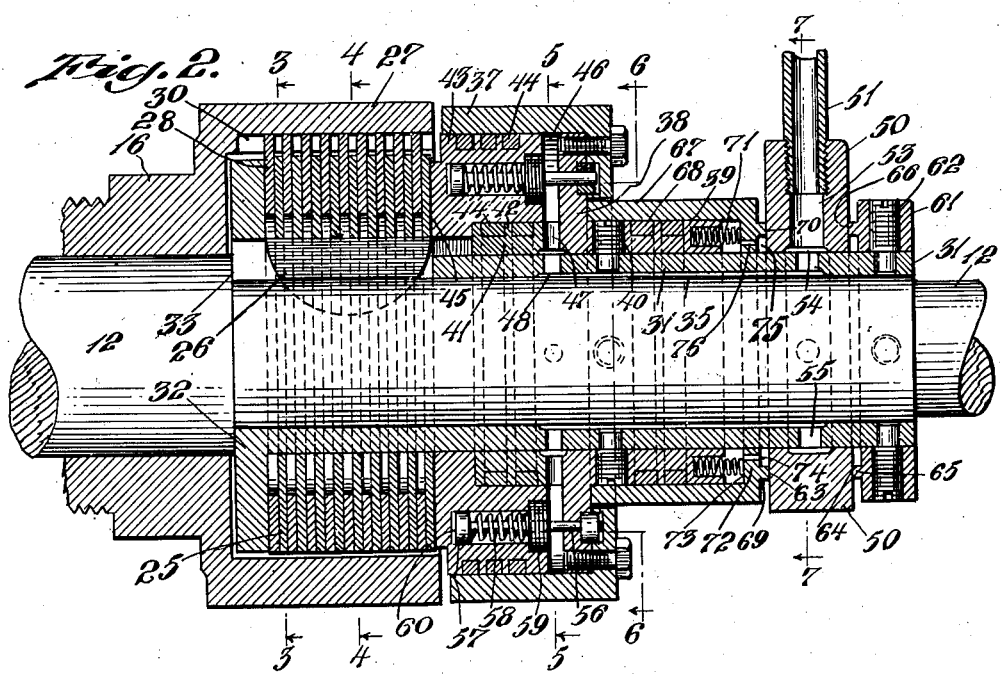
Fig. 2 is a view similar to Fig. 1 on an enlarged scale showing the friction plates and the fluid transmission thereto.

The shaft 12 has keyed to it a plurality of plates 25 such for instance as by means of keys 26 (see Figs. 2 and 4). These plates 25 are slidable upon the shaft 12 axially thereof along the keys 26. The rotary part 16 is provided with a cup-shaped housing 27 which has keyed to it a plurality of plates 28 by means of keys 29 (see Fig. 3) located in recesses 30 in this housing. The plates 28 alternate with plates 25 and extend between them. These plates 28 are likewise slidable with reference to the housing 27 axially of the apparatus.

In order to cause the member 16 to be rotated with the shaft 12 which is continuously driven, pressure is applied to these plates 25 and 28 causing them to move together with sufficient friction so that drive will be imparted from the shaft 12 to the member 16. For this purpose I have provided pressure means (see Fig. 2), the details of mounting of which consists of a tubular member 31 which telescopes over the shaft 12 and is provided with a head, 32, abutting shoulder 33 on shaft 12, to limit its axial movement in one direction while it is keyed to the shaft by the same Woodruff keys 26 which lock the plates 25 to the shaft. This head also serves as an abutment against which the end of the series of plates engages, there being illustrated a plate 28 in engagement with the right hand surface of this head, as shown in Fig. 2. The tubular member is recessed as at 35 for the transmission of fluid axially of the shaft and between the shaft and the tubular member.

A cylinder designated generally 36 (Fig. 1) consists of an outer wall 37 (see Fig. 2) fixed to the flange 38 of a collar 39 which flange forms a bottom wall of the cylinder while this collar 39 is keyed to the tube 31 by the pins 40 so as to be locked therewith. A second collar 41 has its surface 42 providing the inner wall of the cylinder 36 while within this cylinder there is located the annular piston or follower 43 having piston rings 44 engaging the interior surface of the wall 37 to prevent the passage of fluid therethrough, while other piston rings 44 located in recesses in the collar 41 engage the inner surface of the piston to prevent the leakage of fluid therethrough. The end 45 of this piston engages one of the plates 25 which is keyed to the shaft 12. The cylinder chamber 46 has communication with the annular space 35 by reason of the conduit 47 through the member 41 and the conduit 48 through the tubular member 31, while the space 35 is annular and thus is always in communication with these conduits or similar conduits of which there are four located at spaced points of 90° about this member.

A ring 50 encircles the shaft and tubular member 31 and is fixed with relation thereto, having a conduit 51 entering this ring and held by some suitable bracket 52 against rotation. Conduit 53 extending radially of the ring communicates with the annular space 54 in the ring about the tubular member 31 while openings 55 (see Fig. 7) through the member 31 serve to communicate with the annular space 35 between the member 31 and the shaft 12. Thus, fluid may enter through the tube 51, conduit 53, annular space 54, holes 55, to the annular space 35 and be transmitted to the piston so as to force the same to press the plates 25 and 28 into the desired frictional engagement. When the pressure is released in order to draw the piston away from the plates, I have provided pins 56 secured in the bottom wall 38 in any suitable manner, each of which has a head 57 with a spring 58 to engage a suitable abutment 59 threaded into an enlarged bore in the piston so as to push the piston to the right, as shown in Fig. 2, there being a sufficient clearance 60 for movement of the piston in this direction.

A collar 61 is locked to the tube 31 by means of the set screws 62 and is located on the opposite side of the fixed ring 50. The opposite surfaces of the fixed ring 50 as at 63 and 64 are provided with a ground area for sealing purposes, the collar 61 being provided with a flange 65, and sealing surface 66 to engage with this surface of the fixed ring on one side, while a sleeve 67 is slidably mounted upon the collar 39 with piston rings 68 engaging the inner surface thereof, also having a flange 69 with a ground surface 70 to engage the ground surface 63 on the opposite side of the ring. Springs 71 force this sleeve to cause the surface 70 to engage the sealing surface 63 to transmit pressure to the ring to cause sealing engagement between the surfaces 64 and 66. This spring however applies only a small amount of pressure in the system. However the pressure on the sealing surfaces is controlled by the inwardly extending portion 72 of the sleeve which presents a surface 73 on one side of a greater extent than the surface 74 on the other side between the flange 69 and the tubular member 31. A certain amount of seepage of the fluid will occur along the outer surface of the member 31 so that the area 75 may be filled with fluid which will be transmitted through small openings 76 to the area within the flange 69 and thus there will be present in this fluid the same pressure as applied through the conduit 51. As the area 73 is greater than the area 74 the pressure will tend to force the sleeve 67 toward the sealing ring proportional to the differential of the pressures on the surfaces against which it acts, and accordingly pressure will be applied to the sealing surfaces on one side of the ring and transmitted through the ring, so that pressure will be similarly applied to the sealing surface on the opposite side of the ring, and an effective seal will be provided between the ring 50 and the rotating parts of my clutch.

Figure 8:
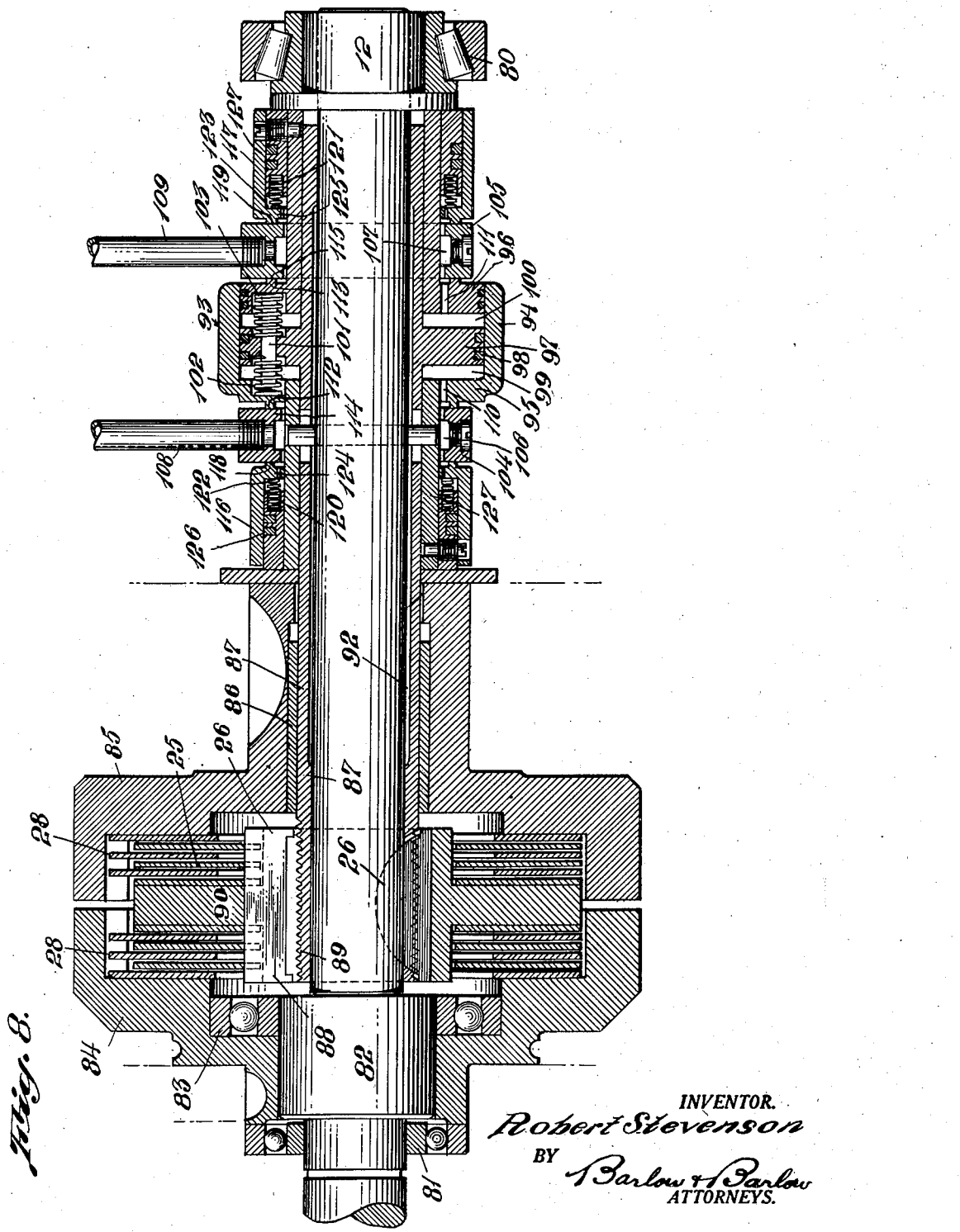
Fig. 8 is a sectional view of a modified arrangement showing a double clutch to which the invention is applied.

In the modification illustrated in Fig. 8 the shaft is designated 12 as previously, mounted in roller bearings 80 at one end and a ball bearing 81 at the opposite end. The enlarged portion 82 of this shaft has mounted thereon a ball bearing 83 to support one part 84 which is to be intermittently driven while another part 85 which is to be intermittently driven is supported through a bushing bearing 86. Clutch plates 28 are keyed to the parts 84 and 85 as described heretofore. In this case however the tubular member or follower 87 while it rotates with the shaft 12 has longitudinal movement relative to the shaft and is provided with a head 88 screwed onto the shaft as at 89 provided with a central abutment member 90. On either side of this central abutment member there are provided a plurality of plates 25 keyed to this head 88 in the same manner as the plates 25 are keyed to the tubular member 31 and shaft 12, for instance as by Woodruff keys 26.

The tube 87 is recessed to provide a space 92 extending annularly about the shaft 12 between the member 87 and the shaft 12. In this case a cylinder 93 encircles the shaft and tubular member 87, having a cylindrical wall 94 and end walls 95 and 96. A piston 97 is located in this cylinder with piston rings 98 engaging the walls thereof, while providing chambers 99 on one side and 100 on the other side of this piston in this cylinder. The piston is provided with a guide pin 101 extending through the same with the coil springs 102 and 103 on either side which are in balanced relation to keep the piston central of the cylinder when no other force is exerted thereon. This piston is locked to the tube 87 or formed as an integral part thereof.

In order to force the piston 97 in different directions I apply fluid to the chambers 99 or 100. A non rotary ring 104 is provided about a tube on one side of the cylinder and a non rotary ring 105 is provided about the tube on the other side of the cylinder. These rings each have an annular space 106 and 107 to which fluid is fed through tubes 108 and 109. The fluid is fed from this annular space 106 through conduit 110 to the chamber 99 to force the piston in one direction (to the right, Fig. 8), or is fed from the space 107 through the conduit 111 into the space 100 to force the piston in the opposite direction. When this piston is forced to the left as shown in Fig. 8 the plates will cause a drive of the member 84, whereas if this piston is forced to the right in Fig. 8 a drive will be effected through the member 85.

In order to provide a seal about the rings 104, 105 flanges 112, 113 are provided on the opposite sides of the cylinder 93 which are ground and engage ground mating surfaces 114, 115 on the rings 104 and 105, while on the other side of the rings there are provided sleeves 116 and 117, also provided with flanges 118 and 119 each with ground surfaces to engage mating ground surfaces on the ring when forced thereagainst. Springs 120 and 121 serve to force these sleeves to cause engagement of the ground surfaces and provide a seal. These springs however are of small force and to supplement this spring pressure when the liquid pressure increases I provide the surfaces 122 and 123 from the inwardly extending portion 124 or 125 of the sleeves such that the seepage of liquid back of this surface and which will be present just inside the flange 118 will assist in forcing the sleeve to cause the sealing surfaces to engage. This action is the same as heretofore presented only it is provided in duplicate with the surfaces of the two sleeves acting toward each other to bring all of the parts into firm sealing engagement. Piston rings 126 and 127 serve to seal the sliding engagement of the sleeves on the tube 127 on which these parts are mounted.

I claim:

In a fluid actuated mechanism, having a solid shaft and a surrounding tubular member rotatable therewith and a passageway formed therebetween for transmitting fluid to said mechanism, means for transmitting fluid to said passageway comprising a fixed ring embracing said tubular member and provided with an annular recess, said ring being connected to a fluid supply source, a port extending through said ring to said recess, ports connecting said recess and said passageway and a seal sleeve surrounding said tubular member and slidable therealong and having a radially extending flange provided with unbalanced areas exposed on opposite sides to the pressure of the actuating fluid whereby said seal sleeve will be moved in directions dependent on the respective areas on the different sides of the flange.

ROBERT STEVENSON.